Figure 1:
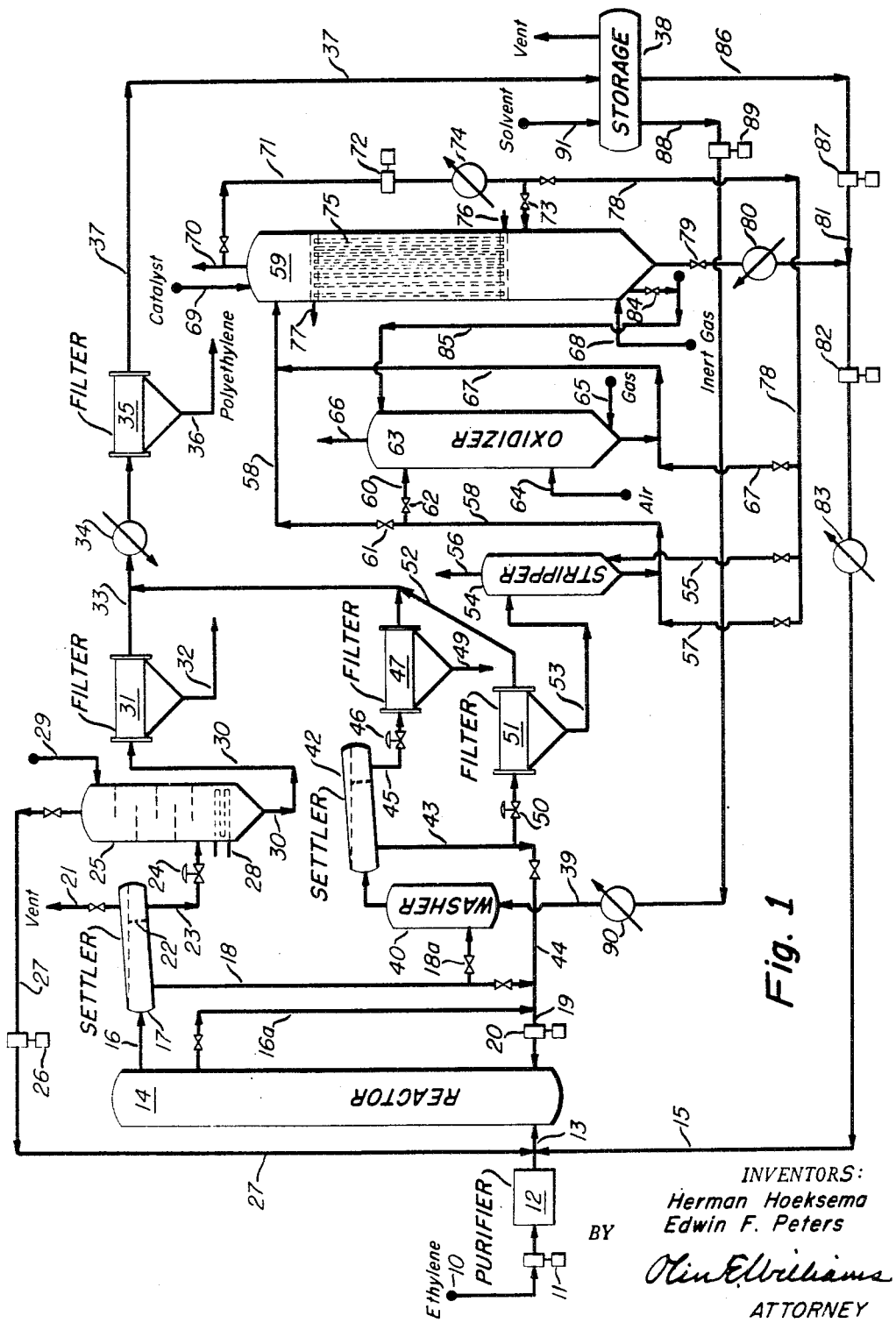

INVENTORS:
Herman Hoeksema
Edwin F. Peters

ATTORNEY

United States Patent Office 2,702,288
Patented Feb. 15, 1955

2,702,288

ETHYLENE POLYMERIZATION PROCESS

Herman Hoeksema, Kalamazoo, Mich., and Edwin F. Peters, Chicago, Ill., assignors to Standard Oil Company, Chicago, Ill., a corporation of Indiana Application August 8, 1952, Serial No. 303,374

13 Claims. (Cl. 260—94.9)

This invention relates to an improved process of polymerizing ethylene, propylene, or mixtures thereof to produce high molecular weight polymers, particularly of ethylene. It pertains more particularly to an ethylene polymerization process employing a solid catalyst that is treated in a novel and economical manner to provide an improved, efficient polymerization process.

The production of resins by the polymerization of ethylene or mixtures of ethylene with other olefins such as propylene in the presence of solid molybdenum-containing catalysts is described at length in copending applications Serial Nos. 223,641, 223,643, and 223,649 filed April 28, 1951, and Serial No. 288,501 filed May 17, 1952, which is a continuation-in-part of Serial No. 223,641. The continuation-in-part application shows that when a catalyst is on-stream for a prolonged period of time its activity gradually declines and it is necessary at frequent periods or continuously to treat the catalyst at elevated temperatures with hydrogen to restore its activity. Occasionally it is also necessary to oxidize a portion of the catalyst and subsequently reduce the oxidized catalyst in order to restore the selectivity of the catalyst, which is the property of the catalyst to govern the polymerization reaction so that polymer of uniform characteristics will be produced. An improved method of operation in which fresh catalyst, reactivated (reduced) catalyst, and regenerated (oxidized and reduced) catalyst are introduced into the polymerization zone in a substantially uniform ratio in which the proportion of regenerated catalyst is maintained at least above a minimum, is disclosed at length in copending application Serial No. 288,516 filed May 17, 1952.

It is an object of this invention to provide an improved process whereby the rate of and yield from polymerization can be uniformly maintained and a polymer of uniform characteristics can be recovered. Another object of this invention is an improved method of operating whereby the polymerization catalyst can be activated or reactivated without the need of added hydrogen. It is a further object of the invention to utilize, in the reactivation of polymerization catalyst, deposits upon the catalyst which are not useful or recoverable as resins. Yet another object of the invention is the provision of an improved method of operating whereby carbonaceous deposits on the polymerization catalyst are removed prior to regeneration of the catalyst so that the requirement to oxidize the catalyst is minimized. Other objects of the invention will be apparent in the ensuing description and claims.

In practicing our invention we polymerize ethylene, propylene, or admixtures thereof in a polymerization zone at elevated temperature and pressure, preferably in the presence of a liquid reaction medium, and in the presence of a molybdena catalyst of uniformly maintained activity and preferably uniform selectivity wherein the said catalyst activity is maintained by heating catalyst in the presence of a hydrocarbon to a temperature which accomplishes the decomposition of the hydrocarbon and the activation of the catalyst. The activation of spent or of fresh, inactive catalyst is accomplished in the absence of any substantial quantity of hydrogen from an external source, thus providing a less expensive polymerization process. The decomposable hydrocarbon can be introduced into the heating zone wherein fresh inactive, or oxidized, or spent catalyst is activated, and it is preferably supplied as a deposit upon the catalyst which is laid down during polymerization and which is not removed in ordinary solvent leaching steps, as is hereinafter described, and which heretofore was customarily burned along with such carbon as may appear on the catalyst. While such products of very high molecular weight have proved refractive to extraction processes, we have found, surprisingly, that at sufficiently elevated temperature in the absence of oxygen, and in the presence, preferably, of inert gas, these high molecular weight deposits will decompose, particularly when they are heated under a vacuum, and a reactivation of the catalyst will be effected. It is suggested, as a theory, that a reducing gas, probably hydrogen, is liberated by the decomposing hydrocarbonaceous deposit and that the obtained activation is accomplished by this reducing gas. If the catalyst is fresh inactive molybdenum compound, or freshly regenerated catalyst, or if, as in some instances, the refractive deposit on the spent catalyst is so small in amount that insufficient hydrocarbon is available to effect an adequate activation of the catalyst, the available hydrocarbon can be supplied or increased either by reducing the amount of extraction treatment given the spent catalyst, by soaking the catalyst in a liquid hydrocarbon or in a solution of a high molecular weight hydrocarbon, by spraying liquid hydrocarbon into the activator, or by introducing directly into the activator a saturated hydrocarbon that will decompose under reactivation conditions.

In carrying out our improved method of operation, we heat an inactive molybdenum catalyst in the presence of a hydrocarbon to a temperature in the range of about 400° to 650° C., preferably 425° to 475° C., and for a time in the range of about 5 minutes to 5 hours. The pressure of activation is not critical but, preferably, the pressure of the activating hydrocarbon should be between about 0.02 and 20 p. s. i. absolute. A primary source of the said hydrocarbon is the refractive deposit which remains on spent polymerization catalyst after removal of polymer by solvent extraction. This deposit is an ethylene polymer of probably about 100,000 to 400,000 molecular weight and a hydrogen-to-carbon ratio of about two, indicating that the deposit is paraffinic. However, the nature of the added hydrocarbon can vary widely. A saturated gaseous hydrocarbon, introduced into contact with solid catalyst and heated to a temperature between 400° and 750° C., will effect activation of the catalyst. Saturated liquid or normally solid hydrocarbons are also suitable. Even xylene, a relatively hydrogen-poor compound, was found effective to reactivate the catalyst. Heavy waxes in solution in a more volatile hydrocarbon were employed to soak solid catalysts, the solvent being evaporated from the catalyst and the wax left as a deposit thereon. The hydrocarbons should be added in an amount such that between 0.1 and 3 percent by weight, based on the catalyst, of hydrocarbonaceous material is present during the said heating step. Preferably, about one half mol of methylene ($CH_2$=) per mol of molybdena should be added in the form of the hydrocarbonaceous material in order to accomplish proper activation of the catalyst. A portion of extracted and stripped spent catalyst can be oxidized either before, or preferably after the hydrocarbonaceous deposit on the catalyst has been used in catalyst reactivation. This small portion of oxidized catalyst can then be returned to the reactivation zone to complete its regeneration and, if insufficient hydrocarbonaceous deposit is introduced into the reactivating zone to effect adequate activation of the catalyst, additional hydrocarbon, e. g., a high molecular paraffin, may be added, just as such added hydrocarbon may be employed in the initial activation of the catalyst when, of course, no deposit of hydrocarbonaceous material is to be found on the catalyst. Oxidation of the said small amount of withdrawn catalyst is accomplished, after product removal, as in the process described in the said application Serial No. 288,516 by treatment with free oxygen containing gas such as air at a temperature in the range of about 450° to 700° C., preferably 550° C., for a period of about 10 minutes to 5 hours, but usually at the shorter times within the range since our novel reactivation step by consuming combustible material measurably reduces the load upon the oxidation step.

Generally speaking, the polymerization conditions, the catalyst, the reaction media, and other improved features, are the same as taught in Serial Nos. 223,641 and 228,516. Polymerization should be performed at a temperature in the range of 75° to 325° C., and preferably about 130° to 300° C., under pressure from 100 up to 10,000 p. s. i. g., preferably about 200 to 2000 or about 1000 p. s. i. g., and with a liquid hourly space velocity in the range of about 1/10 to 10, or preferably 0.5 to 5 volumes of olefin plus reaction medium charged per hour per volume of catalyst into the reactor at any time. The polymerization catalyst is usually a combination of alumina, titania, or zirconia with a molybdenum-oxygen compound in a sub-hexavalent state, in which each catalyst component is present in an amount of at least one percent, and in which the molybdena component is preferably between 5 and 25 percent, but the molybdena can be combined with other supports, such as silica, or active clays if the feed and the solvent are highly purified. The catalyst can be employed in a fixed or fluid bed, but preferably as a slurry in a hydrocarbon reaction medium such as benzene, toluene, xylene, or saturated cyclic hydrocarbon such as tetralin or decalin. The particle size of the catalyst should preferably be of the order from 100 to 200 microns and its surface area in the range of about 40 to 400 square meters per gram.

The employment of our method of catalyst activation in the polymerization of ethylene or propylene results in improvements in the economy and ease of operation and in the quality of the product. It has been found that catalyst that has been activated by heating in the presence of retained deposited polymer retains its activity longer than hydrogen-activated catalyst. The employment of hydrogen from an external source can be eliminated and the amount of oxidation to remove deposited hydrocarbons is less. A smaller amount of steam will be formed in the oxidizer because a smaller amount of hydrocarbonaceous material will be introduced into the oxidizer with the catalyst. This diminution in the amount of steam formed has been found to effect a considerable improvement in catalyst quality and catalyst life.

Figure 2:
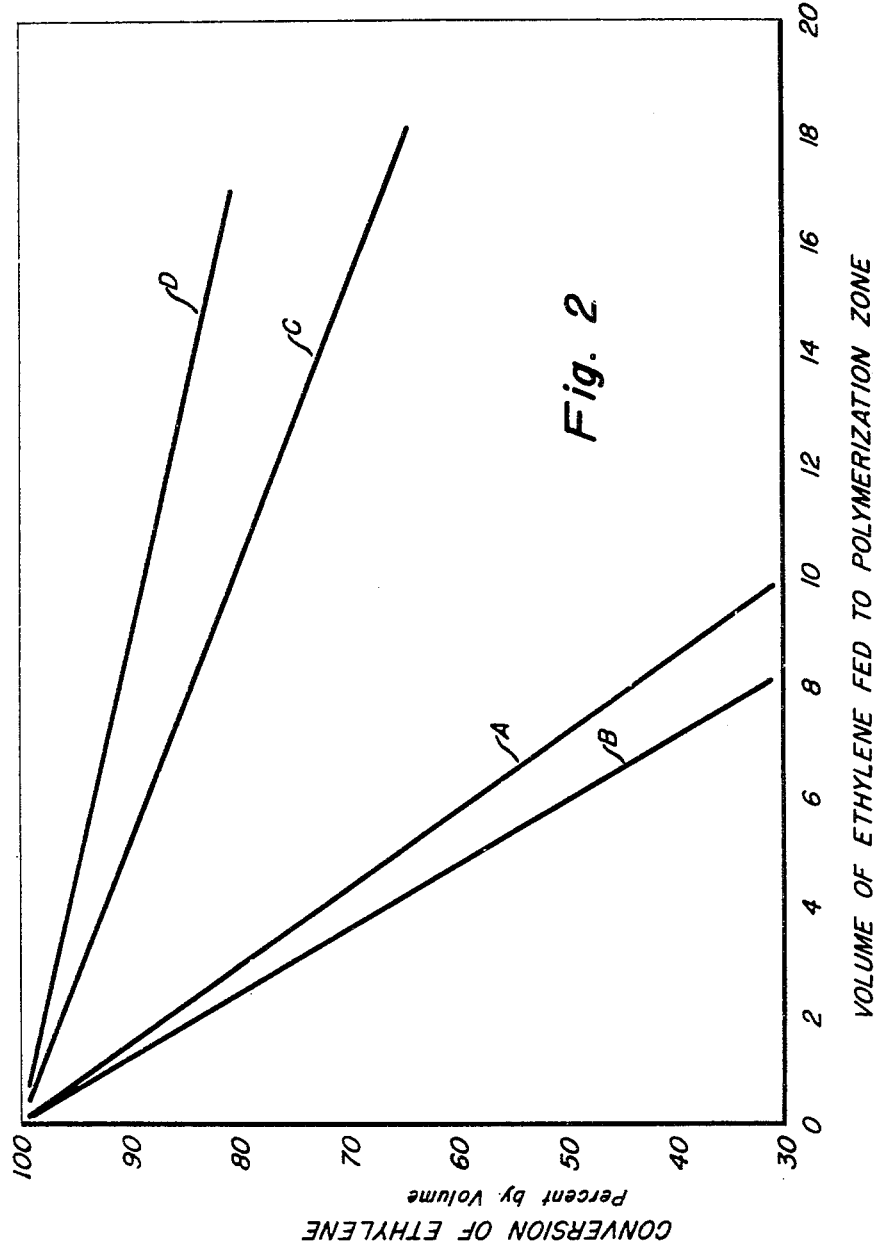

In the accompanying drawings, which serve solely to illustrate the present invention, Figure 1 is a schematic flow diagram of our improved polymerization process and illustrates a detailed description of an example of operation of the process, and Figure 2 is a set of curves diagrammatically presenting the relative improvement in catalyst activity and catalyst life afforded by the invention.

Referring to Figure 1, ethylene from source 10 is introduced by pump 11 to purification system 12 wherein it may be treated with reduced copper oxide and/or silica or alumina gel at a pressure slightly above 1000 p. s. i. g. and a temperature of about 40° C., in order to reduce its oxygen content to less than about 10 parts per million and to remove any other impurities which may be present. No invention is claimed in the purification system per se and any known ethylene purification system may be used.

About 2500 pounds per hour of purified ethylene are then introduced by line 13 to reactor 14, together with about 47,500 pounds per hour of xylene and 5600 pounds per hour of catalyst introduced through line 15. the temperature of the combined stream being about 230° C., and its pressure about 1000 p. s. i. The charged stream thus consists of about 5.0 weight percent solution of ethylene in xylene, which under the defined conditions forms a substantially homogeneous solution.

The catalyst in this case is an alumina-molybdena composition originally containing about 10 weight percent molybdena. The catalyst particles are preferably spherical and their particle size is chiefly in the range of about 100 to 200 microns. In this example, 10 per cent of the catalyst so introduced has previously been regenerated (oxidized and reduced) and about 90 percent of it has been reactivated by heating the catalyst to an elevated temperature in the absence of oxygen or externally produced hydrogen, and this catalyst plus a constant relative amount of fresh, activated catalyst is introduced in this constant proportion at a constant rate into the base of the reactor.

The reactor 14 is a cylindrical vessel about 5 feet in diameter and about 25-30 feet in height through which the charging stock stream passes upwardly at a rate of about .01 to .02 foot per second. Since there is a tendency for the catalyst to slip or settle out of the upflowing liquid stream, the reactor will contain a large amount of catalyst, which in this example may be in the range of 25,000 to 50,000 pounds. The reactor is maintained at a pressure of approximately 1000 p. s. i., and at a temperature of about 230° C., primarily by preheating the charging stock although supplemental methods of heating the reactor can be employed. The weight space velocity will be of the order of about 1 to 2, the residence time of the charge being approximately 30 minutes and of the catalyst being about 4 to 10 hours. Polymer is produced on the surface of the catalyst and is at least partially dissolved in situ by the solvent medium. The reactor contents can be internally recycled through valved line 16a. Reactor effluent leaves the top of the reactor by line 16 to settler 17 carrying suspended catalyst at the same rate as that at which catalyst is introduced into the reactor so that the reactor at all times contains a substantially constant amount of catalyst with a constant ratio of reactivated and regenerated catalyst and a constant degree of over-all catalyst activity.

In settler 17 the bulk of the catalyst settles as a pumpable slurry and is withdrawn by line 18. A part of the slurry may be returned by line 19 and pump 20 to the reactor; if any catalyst is thus returned, a corresponding amount of catalyst will of course be withdrawn through line 16 over and above that amount introduced through line 15. Should any uncondensed gas accumulate in the settler it may be withdrawn through valved line 21.

The upper solvent layer in the settler 17 flows over baffle 22, is withdrawn through line 23, and is released through pressure reduction valve 24 to a zone of reduced pressure, e. g., 200 p. s. i. g., in flash chamber 25. Ethylene that was dissolved in the product liquid is released in the chamber 25, and is pumped by pump 26 through valved line 27 and line 13 into the reactor 14. A heater 28 in the base of the chamber 25 is used to maintain the product liquid at an elevated temperature, usually about 120° C., to about 150° C., and to counteract the cooling effect of expanding the ethylene into chamber 25. Additional xylene, or other solvent, usually about 4000 pounds per hour, is introduced through line 29 into the chamber 25 to reduce the viscosity of the product liquid and ensure the maintenance of polymer in solution. Diluted product liquid flows at reduced pressure from the chamber 25 through line 30 into filter 31. Herein catalyst fines are separated from polymer liquid and are discharged through line 32. These catalyst fines are ordinarily unsuitable for direct recycle to the reactor but can be used in catalyst manufacture. The filter 31 may represent a bank or series of separators and can be replaced or assisted by filtering means (not shown). Product liquid from which catalyst fines have been separated flows through line 33 and cooler 34 from which the liquid is discharged directly into filter 35. The product liquid in the filter 35 is cooled by the said cooler 34 to a temperature of about 60° C. Polyethylene is separated from the said filter 35 and is transported by line 36 to drying, milling and other product treating means (not shown). Xylene from which substantially all polyethylene has been filtered flows through line 37 to storage means 38. A part or all of the xylene flowing through line 37 can be fractionally chilled or distilled in conventional equipment (not shown) to remove, as still residue, accumulations of low molecular weight grease-like polymer that is soluble in hydrocarbon solvents at, for example, room temperature.

Hot solvent from line 39 is introduced into the bottom of washer 40 and is there brought into contact with catalyst slurry, that is introduced into the washer through valved line 18a, preferably at a temperature of about 200° to 400° C., e. g., about 250° C. The slurry of catalyst in hot solvent flows overhead through line 41 to settler 42, from which a pumpable catalyst slurry is withdrawn through line 43. Here again, if catalyst is withdrawn through line 16 more rapidly than it is introduced through line 15, a portion of the slurry may be recycled by lines 44, 19, and pump 20 to the reactor.

Hot solvent that contains some catalyst fines is separated in settler 42 and flows through line 45 and a pressure-reducing valve 46 into a rotary filter 47. The solvent in the rotary filter 47 is filtered at a reduced pressure, preferably slightly in excess of the pressure of liquid product in filter 35. Filtrate from filter 47 flows through line 48 into line 33 ahead of the cooler 34. Catalyst fines separated from the filter are discharged through line 49 and can be discarded or be employed in catalyst manufacture. Alternate filter and backwash means (not shown) can be supplied.

Since it is desirable to remove substantially all liquid from the catalyst which is to be regenerated and reactivated, at least a portion of the slurry from line 43 is introduced through pressure-reducing valve 50 to filter 51, which may be of the rotating drum type enclosed in a pressure vessel and which may be operated at about atmospheric to 200 p. s. i. g., e. g., about 50 p. s. i. g. The amount of such slurry in this example is sufficient to remove to the filter about 5600 pounds per hour of catalyst (the carbonaceous deposit not being included in catalyst weight). The remaining hot solvent is withdrawn as filtrate through line 52 and is delivered, upstream of the cooler 34, to product line 33.

The filter cake from filter 51 is conveyed by a screw conveyor or other known means through line 53 into the upper part of stripper 54 wherein entrained and absorbed solvent is removed by hot inert gas introduced by valved line 55 preferably at a temperature of at most about 315° C., the gases and vapors withdrawn from the top of the stripper through line 56 being passed to a suitable solvent recovery system (not shown) which may be a charcoal absorber or other known means.

The free flowing dry catalyst solids from the base of the stripper are picked up by a hot carrier gas from line 57, which may be any inert gas, and the solids are carried by a gas lift through line 58 to the top of activator 59. A portion of the solids can be flowed from the line 58 through line 60, by the adjustment of valves 61 and 62 in, respectively, lines 58 and 60, and into oxidizer 63. It is, however, usually preferred to direct the entire flow of spent catalyst into the activator 59 wherein a substantial amount of the hydrocarbonaceous deposit on the catalyst is removed in the novel reduction of the catalyst. The load on the oxidizer 63 is thereby considerably reduced because much of the deposit on the relatively small portion of catalyst that is continuously oxidized (about 10 weight percent in the present example), has thus already been removed.

The oxidizer 63 is maintained at a temperature in the range of about 450° to 650° C., e. g., 550° C., by air introduced through line 64 at a point spaced from the bottom of the oxidizing zone. Cool inert gas is introduced by line 65 at the bottom of the oxidizing zone to strip out entrained oxygen and to dilute the air stream in the upper part of the zone and thus avoid overheating of the catalyst in the oxidizing zone, the flue gas being removed from the top of the oxidizer through line 66. The inert gas may be, for example, nitrogen, carbon dioxide, or cooled flue gas. The relative amounts of air and inert gas will depend, of course, upon the amount of carbonaceous deposits to be removed and may vary within relatively wide limits. The upward velocity of the gas need not be high enough to effect fluidization, since a large amount of inert gas can carry away most of the heat of oxidation. Temperature control may be effected in oxidizer 63 in any manner commonly employed in the cooling of moving bed or fluidized reactors.

Hot oxidized catalyst is picked up from the base of oxidizer 63 by inert gas and can be introduced directly through line 67 and the line 58 into the activator along with that major portion of spent catalyst which flows directly from stripper 54 through line 58 into the activator 59.

Alternatively, however, by means of apparatus not shown and especially when a high ratio of the spent catalyst is regenerated, oxidized, as well as fresh catalyst, can be soaked in or sprayed with a high-molecular-weight hydrocarbon, e. g., paraffin wax that is preferably dispersed in a solvent, can be stripped of any retained solvent, and can than be passed into the activator wherein the added hydrocarbon will be decomposed and will effect reduction of the catalyst.

Any inert gas may be employed to fluidize the catalyst in the activator. This inert gas may be introduced through line 68. It will ordinarily be small in relative volume because the operating conditions in the activator will be such that gases will be released from decomposing hydrocarbonaceous deposits therein. The activator may be operated at any temperature between about 400° and 750° C., or preferably between about 425° and 500° C., e. g., 450° C., the minimum temperature required being that at which the hydrocarbonaceous deposits upon the catalyst will decompose and liberate reducing gas to the catalyst surfaces, and the most elevated temperature feasible being below that at which the activity of the catalyst might be destroyed.

Fresh catalyst is introduced through line 69 into the activator 59. We have found that heating fresh catalyst with solid catalyst particles bearing a deposit of high molecular weight ethylene polymer will activate the fresh catalyst even in proportions as high, for example, as 50 percent fresh to 50 percent of coated catalyst. Fresh catalyst, activated in this manner, has been found to produce proportionately less grease and a higher proportion of high molecular weight resin than hydrogen-activated catalyst.

The reducing gas may be internally recycled through line 70, line 71 and pump 72 and be reintroduced through valved line 73 into the activator. The recycled gas can be heated, e. g., by heater 74, or, preferably, the fluidized solids in the activator can be maintained at activator temperature by internal heater 75 supplied, for example, with a heat exchange fluid that is delivered through inlet line 76 and withdrawn through line 77.

Hot reducing gas from heater 74 can in part be flowed through valved line 78 and be employed to dry the catalyst in stripper 54, by passing the hot gases thereunto through line 55, to gas-lift stripped catalyst to the activator, by passing the gases through line 57, or to gas-lift oxidized catalyst to the activator, by passing the gases through line 67.

Activation in the present example is effected at a pressure slightly below 50 p. s. i. g., with the holding time of the catalyst in the activator being about 1 minute to an hour or more, but not more than 5 hours (e. g., about the same length of time as employed in the oxidizer, approximately 30 minutes).

A gaseous hydrocarbon that is decomposable under activator conditions can be substituted for the inert gas that is introduced into the activator 59 through line 68. In this manner additional reducing potential can be supplied to the activator.

Hot catalyst withdrawn through valved line 79 from the base of the activator 59 is passed through a cooler 80 and is picked up by solvent from line 81 and passed by pump 82 and heat exchanger 83 to line 15 for reintroduction to the reactor. Heat exchanger 83 should be operated to bring the slurry to such temperature that when it is admixed with ethylene from line 13 the total mixture will be at approximately 230° C. A portion of the reduced catalyst in activator 59, in this example about 10 weight percent, is removed from the activator through valved line 84 and is flowed by a gas-lift through line 85 into the oxidizer 63.

About 47,500 pounds per hour of solvent are withdrawn from the storage vessel through line 86 by pump 87 to line 81 for picking up activated, regenerated, and reactivated catalyst for recycle. Another portion of the solvent, e. g., about 5000 to 30,000 pounds per hour, is withdrawn through line 88 by pump 89, heated in heater 90 to the temperature required in washer 40, and employed for recovering additional product from the catalyst before the catalyst is subjected to regeneration and reactivation.

Makeup solvent introduced to storage from source 91 should be deaerated and the solvent recycled through line 81 should likewise be deaerated as it becomes aerated in the course of operation.

While we have described in detail a specific example of our invention, it should be understood that many alternative arrangements and modifications will be apparent from the above description to those skilled in the art. For example, screw conveyor 53 may introduce (by a line, not shown) the wet solids directly into the top of activator 59 instead of stripper 54 and, as we have found, the solvent will activate the catalyst, under the prescribed activation conditions.

Fig. 2 illustrates diagrammatically the improvement in catalyst activity that is obtained by heating a spent catalyst in the absence of hydrogen from an external source as compared with activation of the catalyst with hydrogen. The curves in Fig. 2 plot the percent conversion of ethylene against the volume of feed delivered to the reactor for several polymerization runs. In every case, as represented by the several curves, an activated molybdena-alumina catalyst was employed in polymerizing ethylene in solution in uniform concentration (4.5 weight percent) in xylene under conditions which were designed to accentuate the decrease in activity of the catalyst since no fresh catalyst was introduced or any spent catalyst withdrawn during the runs.

In curve A the employed catalyst was a fresh catalyst which was activated at a temperature between about 450° and 480° C. for a period of 5 minutes with 200 pounds per square inch of hydrogen from an external source. Curve A shows the decrease in activity exhibited by this hydrogen-activated catalyst.

Curve B represents an average of three runs in which the spent catalyst from the run of curve A was reactivated with hydrogen from an external source. For the first run, the spent catalyst was reactivated with hydrogen at 200 pounds per square inch pressure for about 5 minutes at 230° C. Spent catalyst from this run was reactivated at 230° C. with hydrogen from an external source at 1600 pounds per square inch pressure for a period of 30 minutes. Spent catalyst from the second run was reactivated with hydrogen from an external source at 1600 pounds per square inch for 80 minutes at 230° C. Curve B is an average showing the relatively rapid rate of decrease of activity of this catalyst when it was reactivated under the foregoing conditions by hydrogen from an external source.

After the catalyst was employed in the three runs represented by curve B, the spent catalyst from the third of these runs was allowed to cool for about 10 hours under pressure of hydrogen to room temperature, the hydrogen was withdrawn, pressure of the catalyst was lowered to about 1.0 mm. Hg, and the catalyst was reactivated by heating it to a temperature between about 425° and 450° C. for about 20 minutes in the absence of hydrogen from an external source. Curve C shows the rate of decrease of activity of this catalyst when employed in ethylene polymerization. It is noted that a more stable catalyst having a considerably lower rate of decrease in activity was provided.

In order to eliminate the possibility that cooling the catalyst in hydrogen affected its final activity, the spent catalyst from the run shown by curve C was cooled to room temperature under an atmosphere of nitrogen, and was then activated by heating it under a vacuum to between about 425° and 450° C. for about 10 minutes in the absence of hydrogen from an external source. Curve D represents the rate of decrease in activity of this catalyst when employed in polymerizing ethylene. It is clear that a more stable and highly active catalyst was provided by heating the catalyst in the absence of hydrogen from an external source and using as reactivating hydrocarbon the refractive deposit of polymer on the catalyst, than by activating the catalyst in the presence of externally supplied hydrogen.

As hereinbefore noted, inactive fresh catalyst and spent catalyst have also been successfully activated by heating the catalyst in the presence of an added hydrocarbon of either relatively low molecular weight, for example xylene, or relatively high molecular weight, for example paraffin wax. Fresh inactive catalyst was mixed with a spent catalyst in a proportion as high as 50 percent by weight of the total mixture and the hydrocarbon deposit on the spent catalyst supplied sufficient activating potential to activate the fresh catalyst.

Propylene and other low molecular weight olefins will copolymerize with ethylene according to our process to produce useful copolymers, and propylene alone will polymerize to produce useful polypropylenes. Reduced cobalt molybdate, which is a subhexavalent molybdenum-oxygen compound, is especially suitable for the polymerization of propylene and ethylene-propylene mixtures.

The operation of our improved process results primarily in the production of ethylene polymers having specific viscosities between about $14,000 \times 10^{-5}$ and $60,000 \times 10^{-5}$, with variations of a single product usually not greater than about $2000 \times 10^{-5}$ and an over-all average of a single product that is substantially uniform. The specific viscosity values were obtained by employing the Staudinger formula (Zeit. Phys. Chem. 171, 129 (1934)), using 0.125 gram of polyethylene per 100 ml. of boiling xylene at 85° C., for viscosity measurements, and are the values which define the range of commercially suitable polyethylenes. The specific viscosity of polyethylene is a readily determined physical characteristic, and changes in specific viscosity are probably indicative of parallel changes in molecular weight. Thus our process equally results in maintaining a substantially uniform molecular weight.

Having described our invention, we claim:

1. In a process for polymerizing an olefin selected from the group consisting of ethylene, propylene and mixtures of ethylene and propylene in a polymerization zone under polymerization conditions of temperature and pressure by contact with an activated catalyst which, before activation, comprises essentially at least one weight percent each of a hexavalent molybdenum-oxygen compound and a metal oxide selected from the class consisting of gamma-alumina, titania and zirconia, the initial activation of said catalyst before use thereof in polymerization having been effected by partially reducing said hexavalent molybdenum-oxygen compound when present on said metal oxide by treatment with a reducing gas at a temperature of at least about 300° C., during which polymerization the said catalyst becomes increasingly less active, the improved method of operation which comprises heating deactivated catalyst in the presence of a hydrocarbon selected from the class consisting of normally liquid and normally solid hydrocarbons which are decomposable at a temperature within the range of about 400° C. to about 750° C., effecting the heating of said deactivated catalyst in the absence of any substantial quantity of hydrogen from an external source to a temperature between about 400° and 750° C. for a period of time sufficient to increase the activity of the catalyst, and thereafter employing the so-activated catalyst in polymerization of the said olefin.

2. A process which comprises polymerizing ethylene by contact with an activated catalyst which, before activation, comprises essentially at least 1 weight percent each of hexavalent molybdenum-oxygen compound and a metal oxide selected from the class consisting of gamma-alumina, titania and zirconia, initial activation of said catalyst before use thereof in polymerization having been effected by partially reducing said hexavalent molybdenum-oxygen compound when present on said metal oxide by treatment with a reducing gas at a temperature of at least about 300° C., effecting polymerization under conditions adapted to produce normally solid ethylene polymer, at least part of which is retained upon the said catalyst, adjusting the concentration of said ethylene polymer with respect to molybdenum in said catalyst to a value equivalent to at least one half mol of methylene per mol of molybdenum, thereafter subjecting the said catalyst and said ethylene polymer to a temperature between about 400° and 750° C., sufficient to effect substantial decomposition of said ethylene polymer and activation of said catalyst, and recycling at least a portion of catalyst thus treated to further contact with ethylene under conditions adapted to produce a normally solid ethylene polymer.

3. In a process for polymerizing an olefin selected from the group consisting of ethylene, propylene and mixtures of ethylene and propylene in a polymerization zone at a temperature in the range of 75° to 325° C., and at a pressure in the range of about 100 to 10,000 pounds per square inch gauge in the presence of a liquid reaction medium and an activated catalyst which, before activation, comprises essentially at least 1 weight percent each of molybdenum trioxide and a metal oxide selected from the class consisting of gamma-alumina, titania and zirconia, initial activation of said catalyst before use thereof in polymerization having been effected by partially reducing said molybdenum trioxide when present on said metal oxide by treatment with a reducing gas at a temperature of at least about 300° C., the improved method of operation which comprises separating catalyst from product polymer and catalyst under conditions that will leave between 0.1 and 3.0 percent by weight, based on catalyst, of said product polymer deposited thereon, heating separated catalyst under a vacuum to a temperature between about 400° and 750° C. for a period of time sufficient to increase the activity of the catalyst and bringing so-activated catalyst into contact with further quantities of olefin and effecting polymerization thereof.

4. In a procsss for polymerizing ethylene in a polymerization zone at a temperature in the range of 75° to 325° C. and at a pressure in the range of about 100 to 10,000 pounds per square inch gauge in the presence of a liquid reaction medium and an activated catalyst which, before activation, comprises essentially at least 1 weight percent each of molybdenum trioxide and a metal oxide selected from the class consisting of gamma-alumina, titania and zirconia, initial activation of said catalyst before use thereof in polymerization having been effected by partially reducing said molybdenum trioxide when present on said metal oxide by treatment with a reducing gas at a temperature of at least about 300° C., the improved method of operation which comprises separating catalyst from product polymer with a solvent, then stripping solvent and deposited polymer from the catalyst at a temperature less than about 315° C. to leave between 0.1 and 3.0 percent of said product polymer on the catalyst, thereafter heating the catalyst to a temperature between about 400° and 750° C. for a period of time sufficient to increase the activity of the catalyst and in the absence of hydrogen added from an external source, thereby effecting decomposition of the said product polymer on the catalyst and so-reducing molybdena of said catalyst, and recycling activated catalyst to the polymerization zone.

5. In a process for polymerizing ethylene in a polymerization zone at a temperature in the range of 75° to 325° C. and at a pressure in the range of about 100 to 10,000 pounds per square inch gauge in the presence of a solvent and an activated catalyst which, before activation, comprises essentially at least 1 weight percent each of molybdenum trioxide and a metal oxide selected from the class consisting of gamma-alumina, titania and zirconia, initial activation of said catalyst before use thereof in polymerization having been effected by partially reducing said molybdenum trioxide when present on said metal oxide by treatment with a reducing gas at a temperature of at least about 300° C., the improved method of operation which comprises continuously separating catalyst from product polymer under conditions such that 0.1 to 3.0 percent by weight of said product polymer remains on the polymer, continuously heating at least one portion of the catalyst after said product separation in the absence of hydrogen added from an external source to a temperature in the range of about 400° to 750° C. for a period of time between about 5 minutes and 5 hours to increase the activity of the catalyst, and recycling so-treated catalyst to the polymerization zone.

6. The method of claim 5 which includes the step of heating the catalyst to a temperature of at most about 315° C. to strip solvent therefrom prior to the said heating step of claim 5.

7. In a process for polymerizing ethylene in a polymerization zone at a temperature in the range of 75° to 325° C. and at a pressure in the range of about 100 to 10,000 pounds per square inch gauge in the presence of a solvent and an activated catalyst, wherein at least a portion of the so-formed polymer is deposited on said activated catalyst, which, before activation, comprises essentially at least 1 weight percent each of a hexavalent molybdenum-oxygen compound and a metal oxide selected from the class consisting of gamma-alumina, titania and zirconia, initial activation of said catalyst before use thereof in polymerization having been effected by partially reducing said hexavalent molybdenum-oxygen compound when present on said metal oxide by treatment with a reducing gas at a temperature of at least about 300° C., the improved method of operation which comprises withdrawing catalyst from the polymerization zone, recovering polymer from the said catalyst under conditions such that between 0.1 and 3.0 weight percent, based on the catalyst, of product polymer will remain on the catalyst, stripping solvent from the catalyst at a temperature of at most about 315° C., oxidizing and reducing one portion of the stripped catalyst to effect a regeneration of the catalyst, reactivating another portion of the catalyst by heating the same to a temperature between 400° and 750° C. for a period of time in the range of about 5 minutes to 5 hours, and continuously introducing into the polymerization zone reactivated catalyst and regenerated catalyst in a ratio that maintains average catalyst activity and average catalyst selectivity in said zone substantially constant.

8. A process for the preparation of a normally solid polymer from an olefin selected from the group consisting of ethylene, propylene and mixtures of ethylene and propylene, which process comprises contacting said olefin at a polymerization temperature between about 75° C. and about 325° C. with an activated catalyst and recovering a solid polymer thus produced, said catalyst, before activation, comprising essentially at least one weight percent each of a hexavalent molybdenum-oxygen compound and a metal oxide selected from the class consisting of gamma-alumina, titania and zirconia, activation of said catalyst before use thereof in polymerization being effected by partially reducing said hexavalent molybdenum-oxygen compound when present on said metal oxide by treatment with a hydrocarbon selected from the group consisting of normally liquid and normally solid hydrocarbons which decompose substantially in the presence of said catalyst at a temperature between about 400° C. and about 750° C. and heating said catalyst and said hydrocarbon to a temperature within the aforesaid hydrocarbon decomposition range to produce an activated polymerization catalyst.

9. The process of claim 8 wherein said catalyst and said hydrocarbon are heated under a hydrocarbon partial pressure between about 0.02 and about 20 p. s. i.

10. The process of claim 8 wherein said hydrocarbon is a wax.

11. The process of claim 8 wherein said hydrocarbon is a solid polymer of ethylene.

12. The process of claim 8 wherein said hydrocarbon is a xylene.

13. The process of claim 8 wherein said hydrocarbon has a hydrogen:carbon atomic ratio between about 1 and about 2.

References Cited in the file of this patent

UNITED STATES PATENTS

| Number | Name | Date |
| --- | --- | --- |
| 2,242,771 | Baker | May 20, 1941 |
| 2,375,725 | Bailey | May 8, 1945 |
| 2,570,067 | Myers | Oct. 2, 1951 |
| 2,572,300 | Arnold | Oct. 23, 1951 |